United States Patent [19]

Brown

[11] Patent Number: 4,681,187

[45] Date of Patent: Jul. 21, 1987

[54] COLLAPSIBLE SAWHORSE

[76] Inventor: David M. Brown, 178 Cheney St., Newport, N.H. 03782

[21] Appl. No.: 883,405

[22] Filed: Jul. 8, 1986

[51] Int. Cl.[4] ........................ B27B 21/00; F16M 11/00

[52] U.S. Cl. .................................... 182/129; 182/153; 182/181; 182/225

[58] Field of Search ......................... 182/153, 181-186, 182/224-226, 159, 160, 129

[56] References Cited

U.S. PATENT DOCUMENTS

| | | | |
|---|---|---|---|
| 434,792 | 8/1890 | Kopf | 182/159 |
| 1,881,755 | 10/1932 | Logan | 182/153 |
| 1,887,301 | 11/1932 | Gordon | 182/159 |
| 2,207,923 | 7/1940 | Kelso | 182/156 |
| 3,040,834 | 6/1962 | Dakin | 182/186 |
| 4,113,056 | 9/1978 | De Lorenzo | 182/153 |
| 4,249,636 | 2/1981 | Jackson | 182/225 |

*Primary Examiner*—Reinaldo P. Machado
*Attorney, Agent, or Firm*—John E. Benoit

[57] ABSTRACT

A collapsible sawhorse having a bench and four legs extending outwardly therefrom at a fixed angle. All of the legs are hinged to the bench so as to be movable between an upright position and a collapsed, substantially flat position. An arm is pivotally mounted to the outer legs at opposite corners of the sawhorse and each arm terminates in an angular finger which mates with a U-shaped bracket extending from plates mounted to directly opposite legs. The sawhorse is secured in its upright position when the fingers mate with the U-shaped bracket and may be folded when the fingers are released from the bracket. A tool holder is hinged to the legs a predetermined distance below the bench so as to be collapsible with the basic structure.

6 Claims, 7 Drawing Figures

FIG. 1
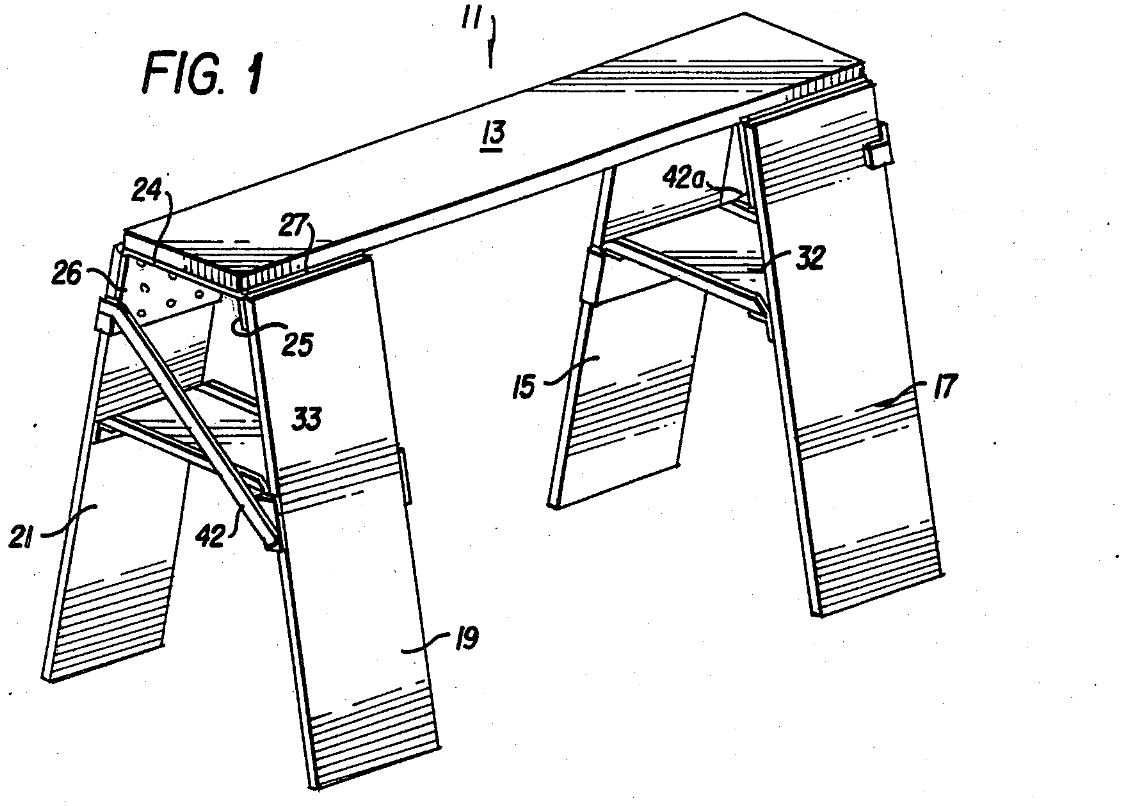
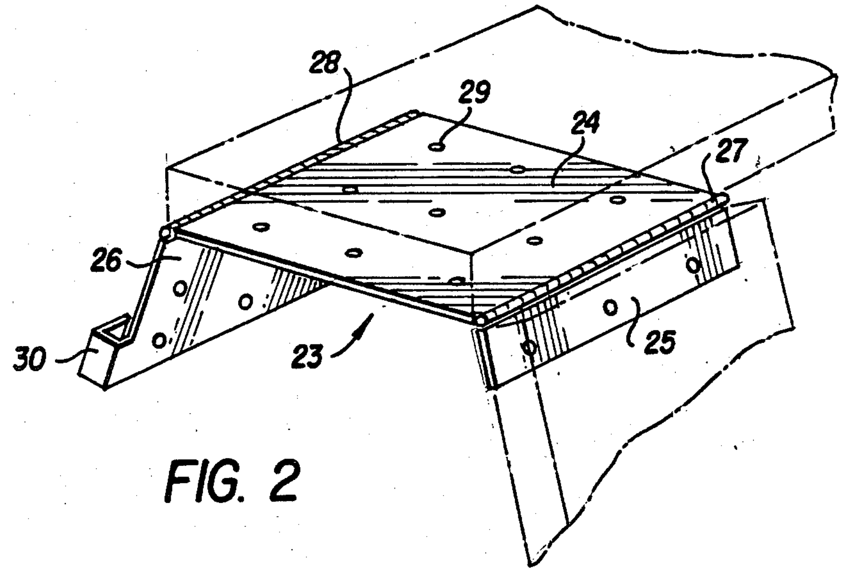
FIG. 2
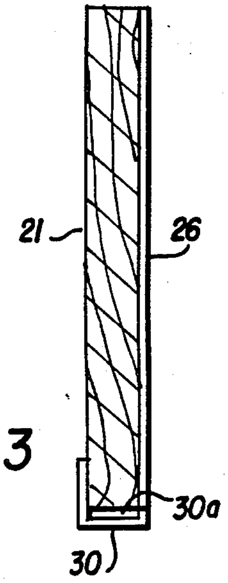
FIG. 3

COLLAPSIBLE SAWHORSE

The present invention relates to sawhorses in general and more particularly to a sawhorse which is collapsible so as to provide a convenient, substantially flat structure for transportation of the sawhorse when not in use.

Sawhorses are well known and have taken many forms, but basically include a bench with subtending angular legs at either end thereof. Braces are usually used to add strength to the legs.

Sawhorses are usually built so as to be a fixed structure which may be stacked one upon one another for transportation, but still are in their upright form when they are carried from workplace to workplace. Oftentimes, this presents problems when moving through stairwells or narrow halls or doorways or the like.

While benches have been proposed for use as sawhorses which may be dismantled and reassembled at the place of usage or which have some removable parts, such workpieces are relatively expensive and also require that care be taken so as not to lose any of the parts. Additionally, there is a time consuming factor in assembly and disassembly of this type of equipment.

Accordingly, it is an object of the present invention to provide a sawhorse which is collapsible to a substantially flat condition without removal from the structure of any of the parts.

A further object of the present invention is to provide a sawhorse having hinged members supporting the bench and leg structures and pivots supporting the necessary braces whereby release of the braces allows the structure to be folded into a substantially flat position for transportation and storage.

A further object is to provide a sawhorse which may be collapsed without removing any parts from the structure, thus saving time and avoiding possible loss of such parts.

These and other objects of the invention will become apparent from the following description when taken together with the drawings.

BRIEF DESCRIPTION OF THE DRAWINGS

FIG. 1 is a perspective view of one embodiment of the sawhorse of the present invention;

FIG. 2 is a perspective view of the leg and bench hinge support member used in the sawhorse of FIG. 1;

FIG. 3 is a sectional view showing one leg of the sawhorse with the support member of FIG. 2 mounted thereon;

SUMMARY OF THE INVENTION

Figure 6:
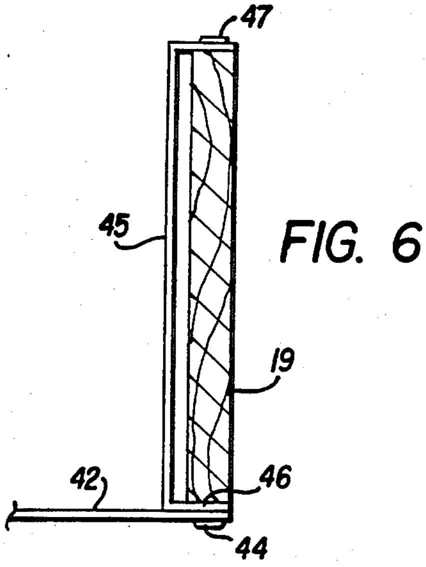
FIG. 6 is a partial sectional view showing the arm support member of FIG. 5 mounted to one of the legs of the sawhorse.

The present invention provides a collapsible sawhorse comprising a bench with two legs depending from the bench on either side thereof and hinge means for connecting the legs to the bench. An arm is pivotally mounted to one of said legs at opposite ends of the bench with the arms having downwardly extending fingers at their terminal end. Female means are mounted on the legs opposite the legs in which the arms are pivoted so as to provide mating with the fingers when the sawhorse is in an upright working position whereby the removal of the arms from female means allow the arms to be pivoted and permit the legs to hinge relative to the bench so that the legs, the bench and the arms can be collapsed to a position substantially adjacent to each other. In the embodiment shown, a tool shelf extends below the bench and is hinged between the legs so as to be collapsible with the entire structure.

DETAILED DESCRIPTION OF THE DRAWINGS

Turning now to the drawings, sawhorse 11 is shown in its upright working position in FIG. 1. The sawhorse comprises a bench 13 and depending legs 15, 17, 19 and 21.

In the embodiment shown, tool shelves 32 and 33 are provided between each of the legs. Support arms 42 and 42*a* are secured between the outer edges of the legs at opposite ends thereof. The structure at each end of the sawhorse is substantially identical and, accordingly, the detailed description will limit itself to one such structure.

Turning now to FIG. 2, bench support member 23, as generally shown in FIG. 1, is shown in detail. Bench support member 23 consists of a substantially flat plate 24 with depending plates 25 and 26 being connected to opposite edges of plate 24 by hinges 27 and 28. Plate 24 and depending plates 25 and 26 include boreholes 29 which allow the plates to be secured to the bench and to the legs respectively. A U-shaped bracket 30 is integral with and extends from legs 26 for purposes which will become obvious as the description proceeds.

FIG. 3 is a partial sectional view showing depending plate 26 secured to leg 21. As can be seen, U-shaped bracket 30 extends outwardly from the leg leaving a space 30A at the end thereof.

Figure 4:
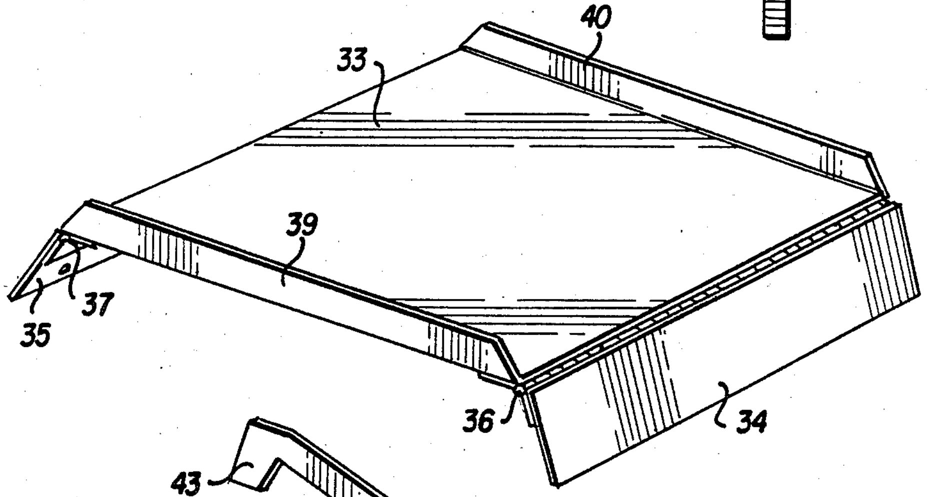
FIG. 4 is a perspective view of a tool holder mounted below the bench of the sawhorse.

FIG. 4 shows a preferred construction of the tool holders 32 and 33 of FIG. 1. Each tool holder consists of a substantially flat plate having legs 34 and 35 connected to the edges thereof on opposite sides by means of hinges 36 and 37. Legs 34 and 35 boreholes 38 so that the tool holder may be secured to the respective legs by means of screws or the like. Additionally, lips 39 and 40 are formed in the plate on either side thereof so as to prevent tools from sliding off the tool holder. Further, these lips effectively form a pocket to accept the adjacent legs when folded. If the tolerance is so designed, the legs create a friction fit with the lips so as to maintain the sawhorse in its collapsed position. If desired, a securing strap (not shown) may also be provided for assuring that the sawhorse remains in its collapsed position.

Figure 5:
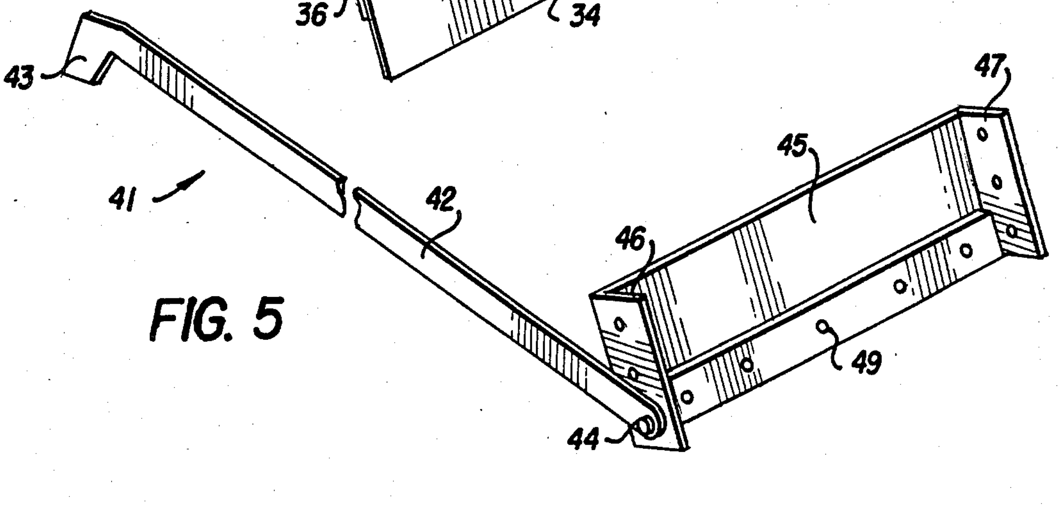
FIG. 5 is a perspective view of the locking arm support member used in the sawhorse of FIG. 1.

The support arm structure member is shown in detail in FIG. 5. It consists of support arm 42 having finger 43 at its terminal end. Arm 42 is pivoted at 44 at its other end to plate 45 having flanges 46 and 47. Again, the plates and flanges have boreholes 49 so that they may be secured to the respective leg. FIG. 6 shows plate 45 secured to leg 19.

Finger 43 of arm 42 is geometrically formed so as to fit within opening 30*a* provided by U-shaped end 30 of plate 26 as shown in FIG. 3. As can be seen from FIG. 1, when finger 43 is mated with slot 30*a*, the arm locks the sawhorse in its position as shown in FIG. 1.

Figure 7:
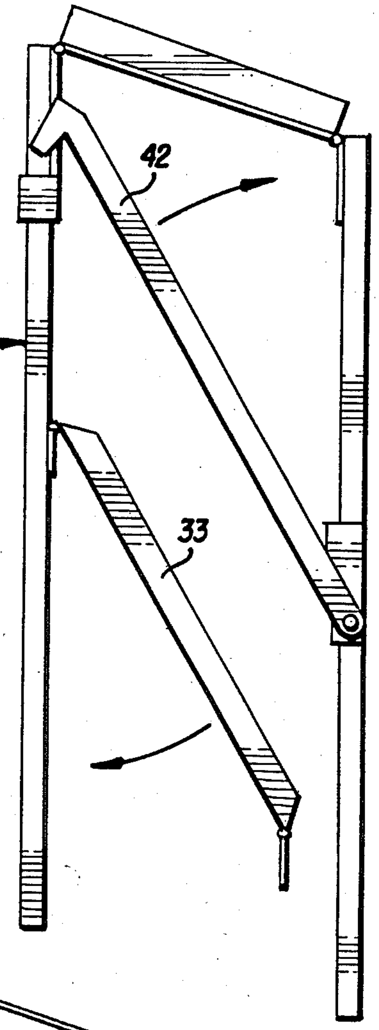
FIG. 7 is a side view of the sawhorse partially folder.

Turning now to FIG. 7, the sawhorse is shown in its partially collapsed position with finger 43 removed from slot 30*a* which permits the arm to be swung clockwise downwardly and frees the legs for hinged movement whereby one leg moves upwardly while the other moves downwardly relative to the shelf and tool holder 33 also pivots relative to the legs so that, as this movement is continued, the sawhorse will ultimately assume a substantially flat condition whereby the legs, the shelf, the tool holder and the arms will lie in substantially adjacent each other. Thus, the sawhorse may be easily carried with reduced bulk so as to reduce the problems which obviously occur when sawhorses are carried in their upright position.

As will now be obvious, the various parts shown and described may be replaced if damaged.

The above description and drawings are illustrative only since various equivalent components could be substituted without departing from the invention, the scope of which is to be limited only by the following claims.

I claim:

1. A collapsible sawhorse comprising
a bench;
two legs depending from said bench on either side thereof;
hinge means for connecting said legs to said bench;
an arm pivotally mounted to one of said legs at opposite sides of said bench, said arms having angularly extending fingers at their terminal ends;
female means mounted on the legs opposite said one of said legs for mating with said fingers when said sawhorse is in an upright position;
a tool shelf extending below said bench; and
hinge means securing said tool shelf between said legs;
whereby said fingers may be removed from said female means and pivoted, permitting said legs to hinge relative to said bench so that said legs, said arms and said bench can be collapsed to a position substantially adjacent to each other.

2. The sawhorse of claim 1 wherein said hinge means for connecting said legs to said bench comprises
a substantially flat plate secured to the underside of said bench and extending substantially to the edges thereof;
depending plates hinged to the edges of said plate and secured to adjacent legs.

3. The sawhorse of claim 2 wherein each of said female means is integral with one of said depending plates.

4. The sawhorse of claim 1 further comprising lips integral with said tool shelf on either side thereof and extending outwardly of said legs.

5. The sawhorse of claim 4 wherein said lips are of a dimension so as to mate with the outer edges of said legs when said sawhorse is in a collapsed condition so as to provide an interference fit between said lips and said legs.

6. A collapsible sawhorse comprising
a bench;
two legs depending from said bench on either side thereof;
hinge means for connecting said legs to said bench;
an arm pivotally mounted to one of said legs at opposite ends of said bench, said arms having angularly extending fingers at their terminal ends;
female means integral with said hinge means mounted on the legs opposite said one of said legs for mating with said fingers when said sawhorse is in an upright position;
whereby said fingers may be removed from said female means and pivoted, permitting said legs to hinge relative to said bench so that said legs, said arms and said bench can be collapsed to a position substantially adjacent to each other.

* * * * *